United States Patent
Höβle et al.

(10) Patent No.: US 10,654,354 B2
(45) Date of Patent: May 19, 2020

(54) HYDRAULIC SYSTEM

(71) Applicant: SAF-HOLLAND GmbH, Bessenbach (DE)

(72) Inventors: Florian Höβle, Bessenbach (DE); Armin Christ, Bessenbach (DE)

(73) Assignee: SAF-HOLLAND GmbH, Bessenbach (DE)

(*) Notice: Subject to any disclaimer, the term of this patent is extended or adjusted under 35 U.S.C. 154(b) by 0 days.

(21) Appl. No.: 16/330,283

(22) PCT Filed: Sep. 4, 2017

(86) PCT No.: PCT/EP2017/072097
§ 371 (c)(1),
(2) Date: Mar. 4, 2019

(87) PCT Pub. No.: WO2018/050468
PCT Pub. Date: Mar. 22, 2018

(65) Prior Publication Data
US 2019/0202282 A1 Jul. 4, 2019

(30) Foreign Application Priority Data
Sep. 13, 2016 (DE) .................. 10 2016 117 158

(51) Int. Cl.
B60K 7/00 (2006.01)
B60D 1/64 (2006.01)
B62D 13/00 (2006.01)

(52) U.S. Cl.
CPC .............. B60K 7/0015 (2013.01); B60D 1/64 (2013.01); B62D 13/00 (2013.01);
(Continued)

(58) Field of Classification Search
CPC .............. B60K 2001/0444; B60K 6/12; B60K 7/0015; B62D 59/00; B62D 59/02; B62D 59/04
(Continued)

(56) References Cited

U.S. PATENT DOCUMENTS 3,860,081 A * 1/1975 Moll ........................ B60K 1/02
180/14.3
3,874,470 A * 4/1975 Greene .............. B62D 53/0871
180/14.3
(Continued)

FOREIGN PATENT DOCUMENTS

DE 1430605 11/1968
DE 68919687 5/1995
(Continued)

OTHER PUBLICATIONS

European Patent Office; International Search Report; dated Oct. 27, 2017.

Primary Examiner — Jeffrey J Restifo
(74) Attorney, Agent, or Firm — Price Heneveld LLP

(57) ABSTRACT

A hydraulic system for utility vehicles includes an auxiliary drive, a hydraulic pump and a first valve arrangement, wherein, in an operating mode, the auxiliary drive is supplied with hydraulic energy by the hydraulic pump via the first valve arrangement, wherein, in addition to the auxiliary drive, the hydraulic pump supplies at least one further hydraulically operated system with hydraulic energy, wherein the hydraulic pump is arranged on a tractor vehicle, and wherein the auxiliary drive is arranged on a trailer, which is able to be coupled to the tractor vehicle.

19 Claims, 1 Drawing Sheet

(52) U.S. Cl.
CPC ... *B60K 2007/0061* (2013.01); *B60Y 2200/14* (2013.01); *B60Y 2200/147* (2013.01); *B60Y 2200/148* (2013.01)

(58) Field of Classification Search
USPC .................. 180/53.4, 305, 306, 307, 308
See application file for complete search history.

(56) References Cited

U.S. PATENT DOCUMENTS

| | | | | |
|---|---|---|---|---|
| 3,913,697 A * | 10/1975 | Greene | ................ | B60K 17/356 180/14.3 |
| 3,994,353 A * | 11/1976 | Greene | ................ | B60K 17/356 180/14.3 |
| 4,082,157 A * | 4/1978 | Sternberg | ............. | B62D 49/005 180/14.3 |
| 4,162,713 A | 7/1979 | Heitman et al. | | |
| 4,185,710 A * | 1/1980 | Kronogard | ........... | B60K 17/356 180/14.3 |
| 4,470,475 A * | 9/1984 | Carlson | ................ | B62D 53/005 180/6.48 |
| 4,518,053 A * | 5/1985 | Queveau | ................... | B60T 1/08 180/14.2 |
| 4,542,990 A * | 9/1985 | Fouquet | ................. | B60K 17/10 366/61 |
| 4,586,578 A * | 5/1986 | Brown | ................... | B62D 59/02 180/14.4 |
| 4,762,192 A * | 8/1988 | Maxwell | ................... | B60P 3/40 180/14.2 |
| 4,976,331 A * | 12/1990 | Noerens | ................ | B62D 59/02 180/14.3 |
| 4,991,672 A * | 2/1991 | Leino | .................... | B62D 59/02 180/14.3 |
| 5,887,674 A * | 3/1999 | Gray, Jr. | ................. | B60K 5/08 180/307 |
| 6,880,651 B2 * | 4/2005 | Loh | ........................ | B62D 12/00 180/14.2 |
| 6,973,981 B2 * | 12/2005 | Stummer | ............... | B62D 53/00 180/14.2 |
| 7,147,070 B2 * | 12/2006 | Leclerc | .................... | B60K 1/00 180/14.2 |
| 8,899,362 B2 * | 12/2014 | Kvist | .................. | B60K 17/356 180/165 |
| 9,108,691 B2 * | 8/2015 | Fanourakis | ........... | B60W 20/15 |
| 9,566,854 B2 * | 2/2017 | Kerschl | .................... | B60D 1/64 |

FOREIGN PATENT DOCUMENTS

| | | |
|---|---|---|
| GB | 697541 | 9/1953 |
| WO | 2009023931 | 2/2009 |
| WO | 2011079947 | 7/2011 |

* cited by examiner

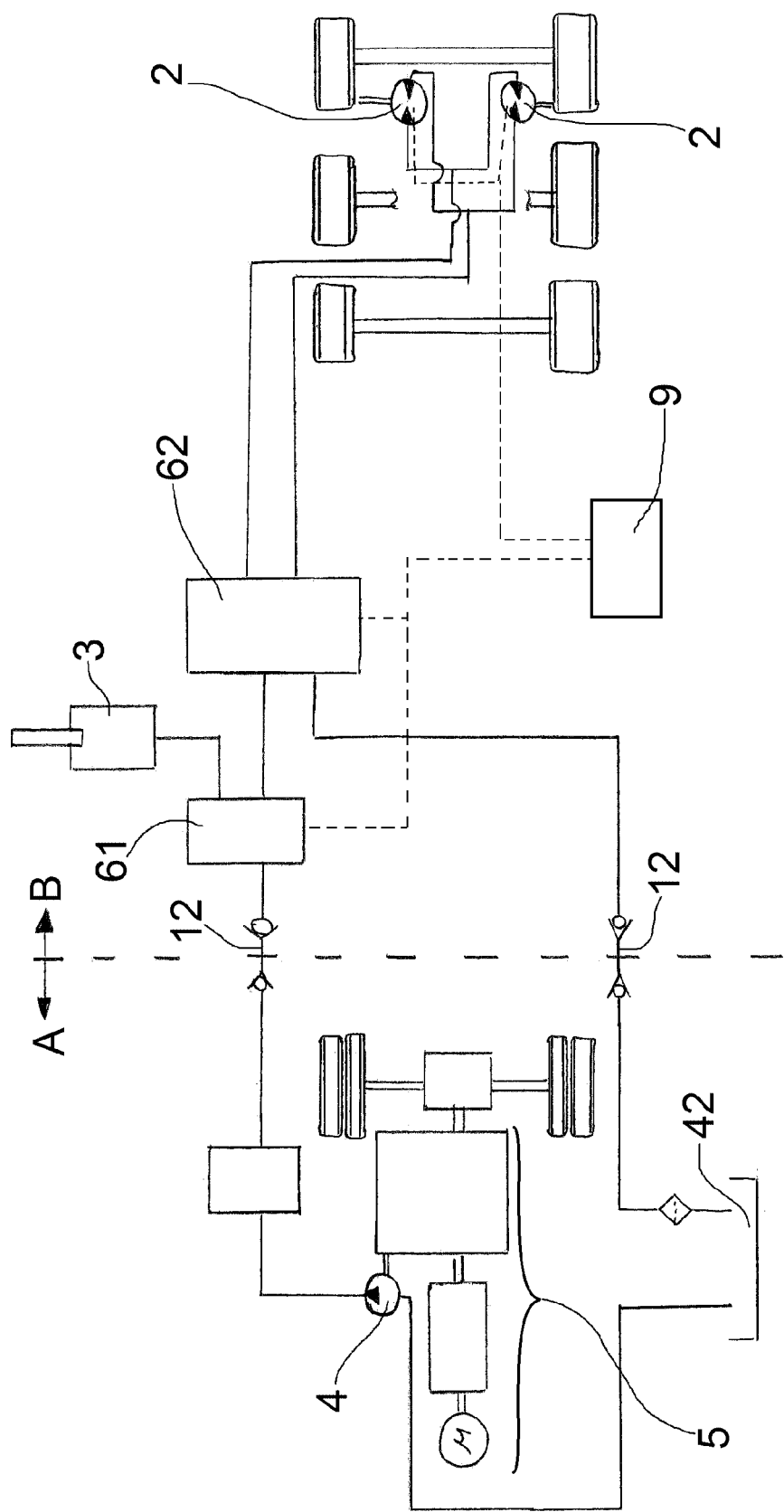

HYDRAULIC SYSTEM

BACKGROUND OF THE INVENTION

The present invention relates to a hydraulic system for operating an auxiliary drive, and to a utility vehicle having such a hydraulic system.

Hydraulically operated auxiliary drives are known per se from the prior art. Here, the formation of the auxiliary drives via completely separate hydraulic circuits, normally designed as a closed hydraulic circuit, has become established. The advantage of this actuation of the hydraulic auxiliary drive by a separate hydraulic circuit is that the auxiliary drive is able to be operated substantially independently of the hydraulic system of the motor vehicle. A disadvantage in the case of such a hydraulic circuit additionally introduced on the motor vehicle is the high additional weight and a high level of outlay in terms of control both for the pumps and for the hydraulic valves. In particular for the case of a trailer which is coupled to a tractor vehicle, wherein the tractor vehicle has a separate hydraulic system, the additional device of a further hydraulic circuit for operating an auxiliary drive brings about a particularly negative increase in the total weight of the combination of tractor vehicle and trailer.

It is an object of the present invention to provide a hydraulic system which is light and is able to be produced with few additional elements and which is designed in particular for the operation of an auxiliary drive.

SUMMARY OF THE INVENTION

According to the invention, the hydraulic system comprises an auxiliary drive, a hydraulic pump and a first valve arrangement, wherein, in an operating mode, the auxiliary drive is supplied with hydraulic energy by the hydraulic pump via the first valve arrangement, wherein, in addition to the auxiliary drive, the hydraulic pump supplies at least one further hydraulically operated system with hydraulic energy, wherein the hydraulic pump is arranged on a tractor vehicle, and wherein the auxiliary drive is arranged on a trailer, which is able to be coupled to the tractor vehicle. The hydraulic system within the meaning of the present invention thus preferably extends to a tractor vehicle and a trailer which is able to be coupled or hitched to said tractor vehicle. The auxiliary drive is preferably a hydrostatic motor which is able to be connected to the wheel suspension of a vehicle wheel of the trailer. The operating state in which the auxiliary drive transmits a torque to the vehicle wheel of the trailer is in this case referred to as the operating mode of the auxiliary drive. In addition to the auxiliary drive in the operating mode thereof, the hydraulic pump also supplies at least one further hydraulically operated system with hydraulic energy. Such a further hydraulically operated system may for example be a tipping device for the loading region of a bulk materials trailer, a hydraulically displaceable sliding floor and a hydraulically operated tailgate. The hydraulic pump is advantageously designed for the parallel supply of hydraulic energy to at least two hydraulically operated systems, that is to say the auxiliary drive and a further hydraulically operated system. The hydraulic pump is arranged on the tractor vehicle and is connected to a first valve arrangement via hydraulic lines. Here, the first valve arrangement passes on the pressurized hydraulic fluid, provided by the hydraulic pump, to the auxiliary drive if the latter is in its operating mode.

Preferably, the auxiliary drive and the hydraulic pump are arranged in an open hydraulic circuit. An open hydraulic circuit is characterized in that an expansion or storage tank is provided. Here, the hydraulic pump is fed from said storage tank. In order to increase the maximum pressure in the hydraulic system, the storage tank itself can be pressurized with a pressure of approximately 2 to 3 bar. The advantage of an open hydraulic circuit is that this can be easily adapted to a different or variable number of hydraulically operated systems in that the volume of hydraulic fluid in the storage tank, or the storage tank itself, is simply adapted. Furthermore, it is preferably also possible to provide a multiplicity of storage tanks both on the tractor vehicle also a multiplicity of storage tanks both on the tractor vehicle and on the trailer in order in particular to be able to expediently use the installation space in the region of the vehicle.

Preferably, during the normal operation of the utility vehicle, only one hydraulic pump on the tractor vehicle is in operation. Thus, advantageously, apart from the hydraulic pump of the hydraulic circuit on the tractor vehicle, no further hydraulic pump is provided on the tractor vehicle or on the trailer. In this way, it is possible in particular for the production price of the hydraulic system and also the weight of the hydraulic system to be significantly reduced. In other words, the hydraulic pump operates all the hydraulically operated systems provided in the hydraulic system, such as for example the auxiliary drive, a hydraulically operated tailgate, a sliding floor or the tipping function at a trailer provided for bulk materials.

It is advantageous if the first valve arrangement actuates the auxiliary drive and/or a further hydraulically operated system. Here, the first valve arrangement is preferably a valve block which controls the supply of hydraulic energy for individual hydraulically operated systems. In particular, in this case, the first valve arrangement opens up a hydraulic fluid path for a specific hydraulically operated system connected to the hydraulic system or blocks said path.

The first valve arrangement is advantageously arranged and fixed on the trailer. In this preferred case, the first valve arrangement controls the hydraulically operated systems, which are provided on the trailer. Such a hydraulically operated system is for example a tipping device for a trailer designed as a bulk materials carrier, or a hydraulically operated tailgate, or the auxiliary drive. For this preferred case, it is merely necessary for the trailer to be provided with a feed line and a discharge line for hydraulic fluid in order to be able to connect said lines to corresponding hydraulic lines of a tractor vehicle. In this way, the trailer is designed for being connected in a simple manner to the hydraulic system of a tractor vehicle and for being able to use said system for a preferred multiplicity of hydraulically operated systems on the trailer.

The hydraulic pump is advantageously driven directly or indirectly by a primary drive of the tractor vehicle. The main drive motor is particularly preferably defined as the primary drive of the tractor vehicle, which main drive motor also ensures the propulsion of the wheels of the tractor vehicle. It is preferably the case here that the hydraulic pump is mechanically connected to the motor via a gearing, wherein a coupling may be provided, in order for hydraulic pump to be put out of operation when the hydraulic system is not required. Alternatively, the hydraulic pump may also be electrically operated and connected to the alternator or the electrical power generator of the tractor vehicle. The overall efficiency of the tractor vehicle can be improved in that the hydraulic pump does not require a separate drive, such as for example an additional internal combustion engine.

Preferably, a second valve arrangement, which is designed for setting the running direction of the auxiliary drive, is provided on the trailer. While the first valve arrangement activates or deactivates the supply of hydraulic energy to the auxiliary drive, the second valve arrangement is provided in particular for setting a specific direction of movement of the auxiliary drive. Like the first valve arrangement, the second valve arrangement is preferably arranged on the trailer, and thereby in the preferably direct vicinity of the auxiliary drive, in order in particular to keep as short as possible the hydraulic lines to be routed between the auxiliary drive and the second valve arrangement. In this way, the weight of the hydraulic system can in turn be reduced. In one preferred variant, it is also possible for the first and second valve arrangements to be combined in a common valve system or valve block.

Preferably, two auxiliary drives are provided, and are arranged and fixed on in each case one wheel suspension of the trailer. Thus, the hydraulic system is advantageously designed for supplying two auxiliary drives with hydraulic energy. Here, it is in particular the case that the first and second valve arrangements are designed either for supplying the two auxiliary drives with equal hydraulic energy or, according to journey and state of movement of the trailer, for supplying one of the drives with slightly more hydraulic energy than the in each case other one in order to facilitate a steering movement of the trailer.

A detachable hydraulic coupling is advantageously provided between the tractor vehicle and the trailer. Particularly preferably, for said hydraulic coupling, a form-fitting engagement, able to be established and released by way of simple hand grips, between two hydraulic line elements, of which in each case one is arranged on the tractor vehicle and the in each case other one is arranged on the trailer, is established here. In the simplest case of the hydraulic system, there are provided here between the tractor vehicle and the trailer two hydraulic couplings, of which one controls the feeding of hydraulic fluid to the trailer and the other one controls in each case the returning of hydraulic fluid to the tractor vehicle.

A control unit is advantageously provided, which actuates at least the first valve arrangement. Here, the control unit is a control device which is designed for sending electrical or mechanical switching signals directly or indirectly to the valves of the first valve arrangement in order to open or to close said valves. Here, the control unit may be installed in the direct vicinity of the first valve arrangement and may particularly preferably have a mechanical coupling to the valves of the first valve arrangement. The control unit is furthermore preferably designed for receiving command signals which are sent by the user of the hydraulic system preferably from the tractor vehicle and have the purpose of bringing about corresponding switching of the first valve arrangement. Particularly preferably, the control unit furthermore has a regulating function, which receives measurement signals in particular with regard to the rotational speed of the vehicle wheels or the state of movement of the further hydraulically operated systems on the trailer and accordingly sets a switching position of the valves of the first valve arrangement, which switching position is optimal for this operating state. In addition to the first valve arrangement, the control unit advantageously also actuates a second valve arrangement in the above-described manner.

Particularly preferably, the control unit is arranged and fixed on the trailer, wherein an electrical connection is able to be established between the tractor vehicle and the control unit. Particularly preferably, the control unit is thus supplied with electrical energy by the tractor vehicle and receives therefrom the commands or control signals which predefine a specific control of the valves of the first valve arrangement and preferably also the valves of the second valve arrangement. Thus, the trailer advantageously does not need to provide a separate electrical energy source but can use the electrical energy which is provided by the generator, in particular the alternator, of the tractor vehicle.

According to the invention, a utility vehicle is provided, which comprises a tractor vehicle and a trailer, wherein the trailer is mechanically coupled or able to be mechanically coupled to the tractor vehicle, and wherein a hydraulic system having the above-described features is provided, said hydraulic system having hydraulic couplings in the coupling region between the tractor vehicle and the trailer. In particular a utility vehicle which consists of a tractor vehicle and a trailer is able to make particularly good use of the advantages of the hydraulic system according to the invention. The preferred area of application of the hydraulic system on a utility vehicle with tractor vehicle and trailer is thus advantageously provided.

BRIEF DESCRIPTION OF THE DRAWINGS

Further advantages and features will emerge from the following description with reference to the appended FIGURE.

FIG. 1 shows a schematic diagram of a preferred embodiment of a hydraulic system according to the invention.

DETAILED DESCRIPTION OF THE PREFERRED EMBODIMENT

FIG. 1 schematically shows a hydraulic system which extends over the basic assemblies of tractor vehicle A and trailer B. Hydraulic couplings 12 are provided in the connection or coupling region between the tractor vehicle A and the trailer B. Said couplings are, as illustrated schematically, preferably provided with check valves, in order, in the event that the lines are separated from one another, to prevent hydraulic fluid from escaping from one of the two line parts. The hydraulic pump 4 is arranged in the region of the tractor vehicle A and, in the present preferred exemplary embodiment, is mechanically coupled to the gearing of the primary drive 5 of the tractor vehicle A. Here, the hydraulic pump 4 draws hydraulic fluid out of the storage tank 42, this likewise preferably being arranged and fixed in the region of the tractor vehicle A. By means of the storage tank 42, the hydraulic system 1 is designed as an open hydraulic circuit. Provided in the region of the trailer B is a first valve arrangement 61, which activates or deactivates the supply of hydraulic energy to different hydraulically operated systems. By way of example, FIG. 1 shows an additional hydraulically operated system 3, which is for example the piston arrangement for a tipping device of a utility vehicle trailer. Furthermore, the first valve arrangement 61 also activates or deactivates the supply of hydraulic fluid to the auxiliary drive 2. A second valve arrangement 62 is arranged between the first valve arrangement 61 and the auxiliary drive 2 and in each case determines the direction of travel of the auxiliary drive 2, or of the two auxiliary drives 2 shown in the FIGURE. In the preferred embodiment shown in FIG. 1, it is thus the case that only one of the three axles of the trailer B is equipped with hydraulic auxiliary drives 2. It goes without saying that it is also possible without great effort for a second axle, or even all three axles, of the trailer B to be equipped with hydraulic auxiliary drives 2 and supplied via the first and second valve arrangements 61, 62 with hydraulic fluid. Furthermore, there is preferably provided on the trailer B a control unit 9 which, in the preferred case, preferably actuates both the first valve arrangement 61 and the second valve arrangement 62 using commands. In this case, the control unit preferably receives signals from a user of the hydraulic system 1, who is sitting in the tractor vehicle A. Furthermore, it is preferably possible for the control unit 9 to receive signals from sensors which are provided in the region of the auxiliary drive 2, and to use said signals for influencing the control of the first and second valve arrangements 61, 62. Here, the control unit advantageously receives and processes signals from a sensor which, advantageously, is arranged on the kingpin between tractor vehicle A and trailer B and measures the angle of the longitudinal axles of both parts of the combination. Moreover, the control unit 9 advantageously receives and processes signals from sensors which are arranged in the tractor vehicle A and which measure for example the rotational speed of the wheels of the tractor vehicle A. In a preferred extended embodiment, the control unit 9 is thus simultaneously also a regulating unit, which, depending on the operating state of the hydraulic system 1, can influence the settings at the first and second valve arrangements 61, 62.

LIST OF REFERENCE SIGNS

2 Auxiliary drive
3 System
4 Hydraulic pump
5 Primary drive
9 Control unit
12 Hydraulic coupling
42 Storage tank
61 First valve arrangement
62 Second valve arrangement
A Tractor vehicle
B Trailer

The invention claimed is:

1. A hydraulic system of a utility vehicle including a tractor vehicle and a trailer, comprising:
   an auxiliary drive;
   a hydraulic pump; and
   a first valve arrangement;
   wherein, in an operating mode, the auxiliary drive is supplied with hydraulic energy by the hydraulic pump via the first valve arrangement;
   wherein, in addition to the auxiliary drive, the hydraulic pump supplies at least one further hydraulically operated system with hydraulic energy;
   wherein the hydraulic pump is arranged on the tractor vehicle, and wherein the auxiliary drive is arranged on the trailer, which is able to be coupled to the tractor vehicle;
   wherein two auxiliary drives are arranged on in each case one wheel suspension of the trailer;
   wherein a second valve arrangement is arranged on the trailer and designed for setting the running direction of the auxiliary drive; and
   wherein the first and second valve arrangements are configured either for supplying the two auxiliary drives with equal hydraulic energy, or are configured for supplying one of the drives with more hydraulic energy than the other auxiliary drive according to journey and state of movement of the trailer.

2. The hydraulic system as claimed in claim 1, wherein the auxiliary drive and the hydraulic pump are arranged in an open hydraulic circuit.

3. The hydraulic system as claimed in claim 2, wherein, during the normal operation of the utility vehicle, only one hydraulic pump on the tractor vehicle is in operation.

4. The hydraulic system as claimed in claim 3, wherein the first valve arrangement actuates the auxiliary drive and/or the further hydraulically operated system.

5. The hydraulic system as claimed in claim 4, wherein the first valve arrangement is arranged and fixed on the trailer.

6. The hydraulic system as claimed in claim 5, wherein the hydraulic pump is driven directly by a primary drive of the tractor vehicle.

7. The hydraulic system as claimed in claim 5, wherein the hydraulic pump is driven indirectly by a primary drive of the tractor vehicle.

8. The hydraulic system as claimed in claim 5, wherein a control unit is configured to actuate at least the first valve arrangement.

9. The hydraulic system as claimed in claim 8, wherein the control unit is arranged and fixed on the trailer, and wherein the tractor vehicle and the control unit are electrically connected.

10. The hydraulic system as claimed in claim 9, wherein the tractor vehicle and the trailer are detachably hydraulically coupled.

11. The hydraulic system as claimed in claim 1, wherein, during the normal operation of the utility vehicle, only one hydraulic pump on the tractor vehicle is in operation.

12. The hydraulic system as claimed in claim 1, wherein the first valve arrangement actuates the auxiliary drive and/or the further hydraulically operated system.

13. The hydraulic system as claimed in claim 1, wherein the first valve arrangement is arranged and fixed on the trailer.

14. The hydraulic system as claimed in claim 1, wherein the hydraulic pump is driven directly by a primary drive of the tractor vehicle.

15. The hydraulic system as claimed in claim 1, wherein the hydraulic pump is driven indirectly by a primary drive of the tractor vehicle.

16. The hydraulic system as claimed in claim 1, wherein a control unit is configured to actuate at least the first valve arrangement.

17. The hydraulic system as claimed in claim 16, wherein the control unit is arranged and fixed on the trailer, and wherein the tractor vehicle and the control unit are electrically connected.

18. The hydraulic system as claimed in claim 1, wherein the tractor vehicle and the trailer are detachably hydraulically coupled.

19. A utility vehicle, comprising:
   a tractor vehicle;
   a trailer; and
   the hydraulic system of claim 1 wherein the trailer is configured to be mechanically coupled to the tractor vehicle; and
   wherein the hydraulic system includes hydraulic couplings in a coupling region between tractor vehicle and trailer.

* * * * *